July 6, 1943.                    B. H. SMITH                    2,323,733
                         ELECTRICAL MEASURING DEVICE
                            Filed Aug. 29, 1941

WITNESSES:
N. F. Susser.
C. L. Freedman.

INVENTOR
Benjamin H. Smith.
BY
ATTORNEY

Patented July 6, 1943

2,323,733

UNITED STATES PATENT OFFICE 2,323,733

ELECTRICAL MEASURING DEVICE

Benjamin H. Smith, Bloomfield, N. J., assignor to Westinghouse Electric & Manufacturing Company, East Pittsburgh, Pa., a corporation of Pennsylvania Application August 29, 1941, Serial No. 408,796

4 Claims. (Cl. 171—95)

This invention relates to electrical instrumentalities and it has particular relation to electrical instruments for measuring a plurality of time functions of a variable electrical quantity.

In the electrical art, it often is desirable to provide instrumentalities responsive to different time functions of a variable electrical quantity. For example, instantaneous and time-lagged ammeters both are employed for measuring electrical current. As employed in the prior art, such ammeters have been completely independent of each other.

In accordance with the invention, a time-lag instrumentality is disposed for energization from an instantaneously operating instrumentality. In a specific embodiment of the invention, an instantaneous indicating ammeter which may be of the magnetic vane type is associated with a thermally responsive time-lagged ammeter. The two ammeters have actuating elements enclosed in a common heat insulating enclosure. Consequently, heat emitted by the instantaneous magnetic vane ammeter is applied to the time-lagged ammeter. Since this heat otherwise would be wasted, a substantial improvement in efficiency in a combined ammeter unit is obtained.

It is therefore an object of the invention to provide an improved compact measuring device responsive to a plurality of time functions of a variable electrical quantity.

It is a further object of the invention to provide a measuring device having translating means responsive to the magnetic field produced by current flowing through a conductor element and having auxiliary translating means responsive to heat generated by the passage of electrical current through the conductor element.

It is another object of the invention to provide a common enclosure for the atuating elements of an instantaneous ammeter and of a time-lagged thermal ammeter for subjecting the actuating element of the time-lagged thermal ammeter to heat emitted by the instantaneous ammeter.

Figure 1:
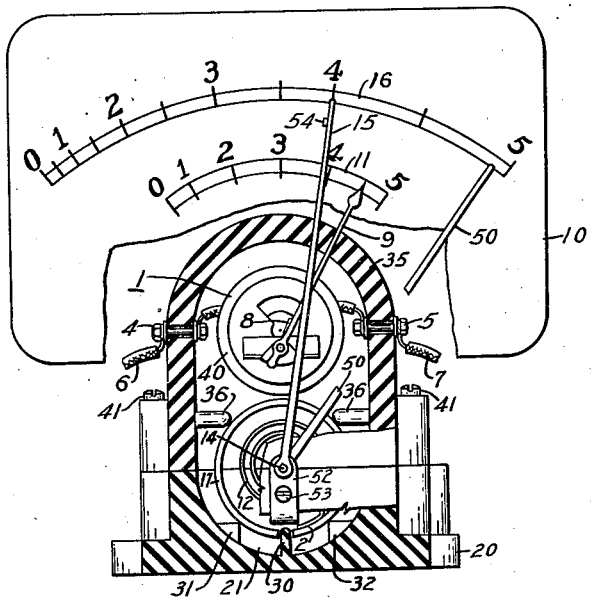
Figure 2:
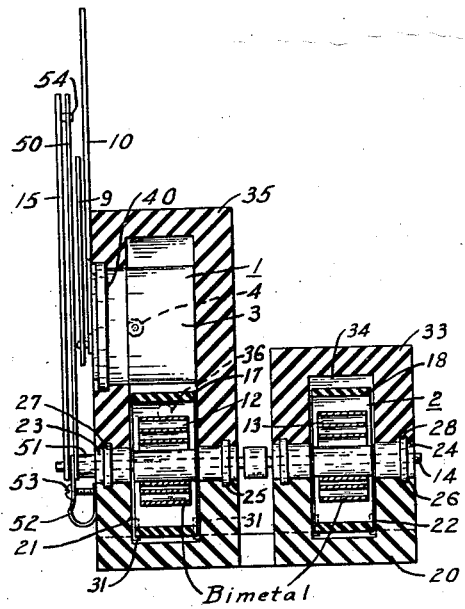

Other objects of the invention will be apparent from the following description taken in conjunction with the accompanying drawing, in which:

Figure 1 is a view in front elevation, with parts broken away, of a measuring device embodying the invention, and Fig. 2 is a view in side elevation, with parts broken away, of the measuring device illustrated in Fig. 1.

Referring to the drawing, a measuring device is disclosed which includes an instantaneous measuring unit 1 and a time-lagged thermally responsive measuring unit 2. The instantaneous unit 1 may be any conventional measuring unit for measuring various electrical quantities such as voltage and current. For the purpose of this discussion, it will be assumed that the measuring instrument 1 is a magnetic vane ammeter of the repulsion type. Such an ammeter includes a winding 3 of electroconductive material having terminals 4 and 5. Electrical conductors 6 and 7 are attached to the terminals for passing through the winding 3 a current proportional to the quantity to be measured. As well understood in the art, a movable magnetic vane 8 is positioned in the magnetic field produced by current flowing through the winding 3 for movement away from a fixed magnetic vane. The movement of the movable magnetic vane is dependent upon the magnitude of current flowing through the winding 3, and the extent of this movement is indicated by means of a pointer 9 which is attached to the movable vane for movement therewith. A dial plate 10 associated with the measuring device carries a scale 11 which cooperates with the pointer 9 to indicate the magnitude of the quantity being measured. A spring (not shown) may be provided for biasing the pointer towards a zero position relative to the scale. A suitable indicating instrument of the magnetic type is more fully disclosed in the Young et al. Patent No. 2,157,947.

The measuring unit 2 is of the time-lagged thermally responsive type. In the specific embodiment illustrated in the drawing, the measuring unit 2 includes two thermally responsive actuating members which may be in the form of bimetallic springs 12 and 13. These bimetallic springs have their inner ends attached to a common shaft 14. A pointer 15 carried by the shaft 14 moves over a scale 16 provided on the dial plate 10 to indicate the movement of the shaft 14. The outer ends of the bimetallic springs 12 and 13 are attached, respectively, to a pair of split rings 17 and 18. These split rings are held in a fixed position by means hereinafter described. The split rings may be formed of any suitable material such as a phenolic resin, steel or brass.

The bimetallic springs 12 and 13 are similar in construction but when heated are disposed to urge the shaft 14 in opposite directions of rotation. For example, the bimetallic spring 12 is designed to urge the shaft 14 and pointer 15 clockwise as viewed in Fig. 1. The bimetallic spring 13 is disposed to urge the shaft 14 and the pointer 15 counterclockwise as viewed in Fig. 1. Consequently, the movement of the pointer 15 is a function of the difference in temperatures of the bimetallic springs 12 and 13.

A housing for the measuring units 1 and 2 is provided which includes a base structure 20. This base structure is formed with two recesses 21 and 22 for receiving, respectively, the lower halves of the bimetallic springs 12 and 13 and the split rings 17 and 18. The base structure 20 also is formed to receive the lower halves of a pair of bearings 23 and 24. For positioning the bearings accurately, arcuate grooves 25 and 26 may be formed in the base structure 20 to receive ring flanges 27 and 28 carried by the bearings. With such a construction the bearings 23 and 24 readily may be removed and inserted with respect to the base structure 20. These bearings are designed to support the shaft 14 for rotation.

To fix the split rings 17 and 18 in predetermined positions, a rib 30 is positioned in each of the recesses 21 and 22 for reception between the ends of each of the split rings. Additional abutments 31 and 32 may be positioned in each of the recesses for spacing each split ring from the wall of the associated recess. With such a construction each of the split rings is positioned accurately in a predetermined position.

An enclosure for the bimetallic spring 13 and the split ring 18 is completed by a cap 33 having a recess 34 for receiving the upper portions of the bimetallic spring and split ring. The cap 33 also is configured to embrace snugly the bearing 24 and the bearing flange 28. The construction of the assembly including the shaft 14, the bimetallic springs 12 and 13, the split rings 17 and 18, the bearings 23 and 24, the base structure 20 and the cap 33 is similar to that disclosed in my prior application Serial No. 393,343, filed May 14, 1941, and entitled Thermal demand meters. The principal difference resides in the elimination of the heaters referred to in my prior application.

As previously indicated, the measuring units 1 and 2 have actuating elements positioned in a common enclosure. For this purpose, a cap 35 is provided for the bimetallic spring 12 and the split ring 17 which is elongated sufficiently to receive the measuring unit 1. The cap 35 may be provided with pins 36 for engaging the split ring 17. These pins cooperate with the abutments 31 and 32 and the rib 30 to assure retention of the split ring and bimetallic spring assembly in a predetermined position. Similar pins (not shown) may be provided in the cap 33 for engaging the split ring 18.

By inspection of the drawing, it will be noted that the cap 35 and the base structure 20 cooperate to define an enclosure sufficient to enclose both the winding 3 of the measuring unit 1 and the bimetallic spring 12. For this reason heat generated by current flowing through the winding 3 is applied to the bimetallic spring 12. This heat serves to raise the temperature of the bimetallic spring 12 above that of the bimetallic spring 13. Since the movement of the pointer 15 is a function of the difference in temperatures of the bimetallic springs, it follows that the movement of the pointer 15 is a function of the heat generated by current flowing in the winding 3. Consequently, the scale 16 may be calibrated to read directly a function of this current.

By inspection of Fig. 2 it will be observed that the measuring unit 1 is inserted through an opening in the cap 35. To prevent the escape of heat generated by current flowing in the winding 23, the cap 35 and the base structure 20 both may be formed of a heat insulating material such as a phenolic resin. To assist further in the prevention of heat escape, the front of the measuring unit 1 may include a rim member 40 which snugly fits the opening formed in the cap 35 and which also is formed of a heat insulating material such as a phenolic resin. The measuring unit 1 may be secured to the cap 35 in any suitable manner as by machine screws (not shown).

The cap 33 also may be formed of heat insulating material such as a phenolic resin. The caps 35 and 33 may be secured to the base structure 20 in any suitable manner as by machine screws or bolts 41.

It is believed that the operation of the measuring device is apparent from the foregoing description thereof. If it is desired to measure the current flowing in an electrical circuit, the conductors 6 and 7 are connected into the circuit to conduct the electrical current through the winding 3 of the magnetic vane instrument or unit 1. The electrical current passing through the winding 3 produces a magnetic field operating to urge the pointer 9 to a position corresponding to the magnitude of the current passing through the winding. The pointer 9 cooperating with the scale 11 consequently indicates the substantially instantaneous value of the current flowing through the associated electrical circuit. For alternating current measurements, the scale 11 may be calibrated to read instantaneous root-mean-square values of current.

Heat generated by electrical current flowing through the winding 3 is applied to the bimetallic spring 12. As the bimetallic spring 12 heats, it urges the pointer 15 in a clockwise direction as viewed in Fig. 1. The rapidity of movement of the pointer 15 depends upon the thermal characteristics of the measuring unit 2. By providing substantial thermal inertia or heat storage in the thermal unit 2 and associated parts of the enclosure, movement of the pointer 15 may be made to lag behind changes in electrical current flowing through the associated electrical circuit. As a sepecific example, the time-lagging of the measuring unit 2 may be such that for a predetermined change in current flowing through the associated electrical circuit, the pointer 15 requires thirty minutes to indicate 90% of this change. By definition, such a measuring unit is said to have a time-lagged interval of thirty minutes.

A time-lagged current reading is desirable for the reason that such a reading follows heating characteristics of the associated electrical circuit or of associated electrical apparatus. Consequently, the time-lagged reading accurately indicates the point at which the associated electrical circuit or apparatus is dangerously overloaded.

If the measuring device is designed for operation in a constant ambient temperature, the bimetallic spring 13, split ring 18, the cap 33, and the portion of the base structure 20 underlying the cap 33 are not required. However, if the measuring device is designed for operation in a variable ambient temperature, the complete device illustrated in the drawing is desirable. Variations in ambient temperature operate to affect both of the bimetallic springs 12 and 13 equally. This is for the reason that the bimetallic springs are similar and the enclosures for the springs have similar characteristics. Since the springs are designed to urge the shaft 14 in opposite directions of rotation, it follows that an equal rise in temperature or drop in temperature of both the springs resulting from a change in ambient temperature has substantially no effect upon movement of pointer 15. For this reason, the measuring device is fully compensated for service under variable ambient temperature conditions.

In measuring devices of this type, it is desirable that a record be obtained of the maximum movement of the pointer 15 over a substantial period of time. Such a record may be obtained by providing the measuring device with a frictionally held maximum demand pointer 50. This pointer is loosely mounted on the shaft 14 for rotation independently of the shaft. The hub of the pointer 50 is urged against a tubular projection 51 carried by the bearing 23. For this purpose, a leaf spring 52 may have a portion loosely positioned over the shaft 14. This leaf spring may be urged against the pointer 50 by operation of a machine screw 53. The machine screw 53 may be operated to clamp the hub of the pointer 50 lightly between the leaf spring 52 and the tubular projection 51. Because of the resulting friction applied to the pointer 50, the pointer is maintained in any position to which it is actuated.

Actuation of the maximum demand pointer 50 is effected by an arm 54 carried by the pointer 15. If the movement of the pointer 15 is sufficient to carry it past its maximum previous movement, the arm 54 engages the pointer 50 to move the pointer 50 further up-scale. Consequently, the maximum demand pointer 50 at all times indicates the maximum previous movement of the pointer 15. At the end of any desired period of time, the pointer 50 may be manually reset for operation over a succeeding period of time.

Although the invention has been described with reference to certain specific embodiments thereof, numerous modifications are possible. Therefore the invention is to be restricted only by the appended claims when interpreted in view of the prior art.

I claim as my invention:

1. In a measuring device, an electrical indicating instrument having actuating means designed for energization by a variable electrical quantity, said actuating means being subject to heating dependent on the energization thereof, said indicating instrument having indicating means responsive to the energization of said actuating means for representing a function of the variable electrical quantity, an instrument having thermal actuating means responsive to the temperature to which said thermal actuating means is subjected, means positioning said thermal actuating means to be heated by heat emitted by said first-named actuating means, and a common enclosure for both of said actuating means, said enclosure being formed of heat insulating material for confining about said thermal actuating means heat emitted by said first-named actuating means.

2. In a measuring device for measuring both instantaneous electrical current values and time-lagged current values; an ammeter having indicating means and current responsive actuating means for actuating said indicating means, said actuating means being subject to heating dependent on the value of current passing therethrough; a time-lagged demand ammeter comprising a pair of thermally responsive actuating elements, and means differentially responsive to said thermally responsive actuating means; means positioning a first one of said thermally responsive actuating elements to be heated by heat emitted by said actuating means, and a common enclosure for said current responsive actuating means and said first one of said thermally responsive actuating elements, said enclosure being formed of heat insulating material for confining about said first one of said thermally responsive actuating elements heat developed by said current responsive actuating means, the second one of said thermally responsive actuating elements being positioned externally of said common enclosure.

3. In a measuring device for measuring both instantaneous electrical current values and maximum demand current values; an ammeter having indicating means and current responsive actuating means for actuating said indicating means, said actuating means being subject to heating dependent on the value of current passing therethrough; a maximum demand ammeter comprising a shaft, a pair of bimetallic springs associated with said shaft, said bimetallic springs being disposed to urge said shaft in opposite directions of rotation when said bimetallic springs are heated; means positioning a first one of said bimetallic springs to be heated by heat emitted by said actuating means, a common enclosure for said first one of said bimetallic springs and said current responsive actuating means, said common enclosure being formed of heat insulating material for confining about the enclosed first bimetallic spring heat developed by said current responsive actuating means, the second one of said bimetallic springs being positioned externally of said enclosure for compensating said maximum demand ammeter against changes in ambient temperature.

4. In an instrument responsive to different functions of a common quantity, an electromagnetic translating device having actuating means subject to heating in accordance with the energization thereof, said instrument also having a thermal actuating element responsive to the temperature to which said actuating element is subjected, and means placing said thermal actuating element in heat receptive relation relative to said actuating means, whereby said instrument is thermally energized in accordance with the energization of said electromagnetic translating device.

BENJAMIN H. SMITH.